(12) United States Patent
Jung et al.

(10) Patent No.: US 10,180,536 B2
(45) Date of Patent: Jan. 15, 2019

(54) LIGHT GUIDE PLATE AND DISPLAY DEVICE HAVING THE SAME

(71) Applicant: Samsung Display Co., Ltd., Yongin-Si, Gyeonggi-Do (KR)

(72) Inventors: Sangwoon Jung, Seongnam-si (KR); Jee-na Lee, Anyang-si (KR); Hyeonmi Lee, Tongyeong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/673,504

(22) Filed: Aug. 10, 2017

(65) Prior Publication Data
US 2018/0128966 A1 May 10, 2018

(30) Foreign Application Priority Data
Nov. 8, 2016 (KR) .......................... 10-2016-0148384

(51) Int. Cl.
*F21V 7/04* (2006.01)
*F21V 8/00* (2006.01)

(52) U.S. Cl.
CPC ......... *G02B 6/0093* (2013.01); *G02B 6/0088* (2013.01); *G02B 6/005* (2013.01); *G02B 6/0061* (2013.01)

(58) Field of Classification Search
CPC .... G02B 6/0093; G02B 6/0088; G02B 6/005; G02B 6/0061
See application file for complete search history.

(56) References Cited

U.S. PATENT DOCUMENTS

| | | | |
|---|---|---|---|
| 7,824,093 B2 | 11/2010 | Kim et al. | |
| 8,113,704 B2* | 2/2012 | Bae | G02F 1/133615 349/61 |
| 8,451,400 B1 | 5/2013 | Hyung et al. | |
| 10,036,845 B2* | 7/2018 | Ha | G02B 6/0036 |
| 2009/0244432 A1 | 10/2009 | Hattori et al. | |
| 2010/0110727 A1 | 5/2010 | Iwasaki | |
| 2014/0055717 A1 | 2/2014 | Benson et al. | |
| 2015/0029745 A1 | 1/2015 | Asano et al. | |
| 2016/0363715 A1* | 12/2016 | Ha | G02B 6/0036 |
| 2017/0351142 A1* | 12/2017 | Imaoku | G02F 1/1335 |

FOREIGN PATENT DOCUMENTS

| | | |
|---|---|---|
| EP | 2853807 A2 | 4/2015 |
| KR | 1020130029679 A | 3/2013 |
| KR | 1020150098707 A | 8/2015 |
| KR | 1020160034510 A | 3/2016 |

* cited by examiner

*Primary Examiner* — Ali Alavi
(74) *Attorney, Agent, or Firm* — Cantor Colburn LLP

(57) ABSTRACT

A display device includes a display panel including a display area and a non-display area; a light guide plate which guides light to the display panel, including: an upper surface including a first area overlapped with the display area and a second area which is disposed adjacent to the first area and overlapped with the non-display area, a lower surface facing the upper surface, a side surface connecting the upper surface and the lower surface to each other, and a plurality of protrusions arranged at the upper surface to be disposed in the second area of the upper surface; a light source which generates and provides the light the side surface of the light guide plate; and an optical sheet between the display panel and the upper surface of the light guide plate, contacting the protrusions in the second area, and spaced apart from the first area.

21 Claims, 11 Drawing Sheets

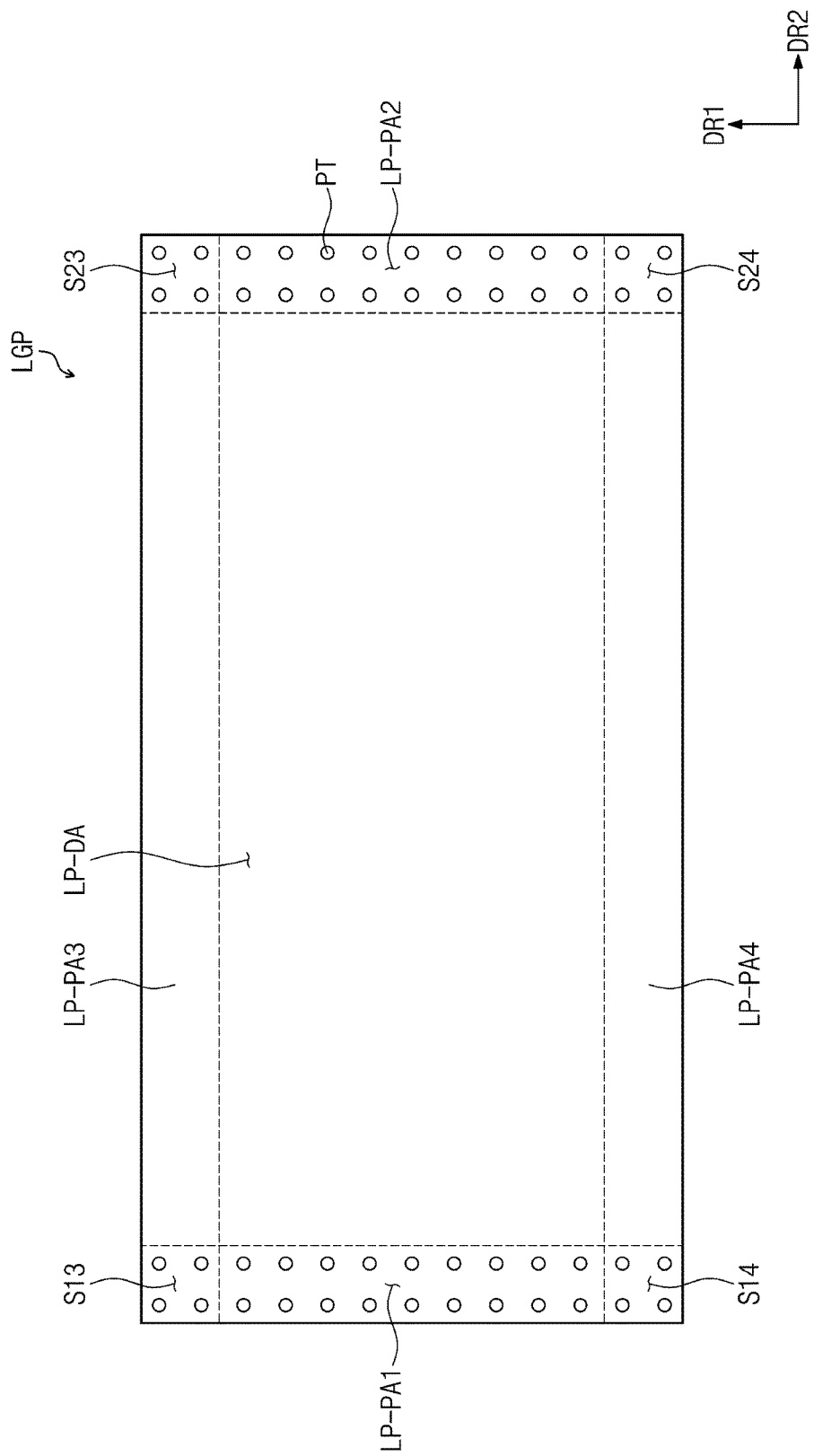

LIGHT GUIDE PLATE AND DISPLAY DEVICE HAVING THE SAME

This application claims priority to Korean Patent Application No. 10-2016-0148384, filed on Nov. 8, 2016, and all the benefits accruing therefrom under 35 U.S.C. § 119, the content of which in its entirety is herein incorporated by reference.

BACKGROUND

1. Field

The present disclosure relates to a display device. More particularly, the present disclosure relates to a display device having a light guide plate.

2. Description of the Related Art

A display device includes a display panel displaying an image. The display panel includes gate lines, data lines, and pixels connected to the gate lines and the data lines.

The display device includes a backlight unit providing a light to the display panel. The backlight unit includes a light source emitting the light, a light guide plate guiding the light emitted from the light source to the display panel, and an optical sheet improving optical characteristics of the light emitted from the light source. The optical sheet is disposed between the display panel and the light guide plate, and the optical sheet is directly arranged on the light guide plate. In this case, the optical sheet has a rigidity greater than that of the light guide plate.

SUMMARY

The present disclosure provides a display device capable of reducing or effectively preventing a light guide plate from being scratched by an optical sheet.

Embodiments of the invention provide a display device including a display panel including a display area and a non-display area which is disposed adjacent to the display area, a light guide plate including an upper surface including a first area overlapped with the display area and a second area which is disposed adjacent to the first area and overlapped with the non-display area, a lower surface facing the upper surface, a side surface connecting the upper surface and the lower surface to each other, and a plurality of protrusions arranged at the upper surface to be disposed in the second area, a light source which provides a light to a portion of the side surface of the light guide plate, and an optical sheet disposed between the display panel and the upper surface, contacting the protrusions in the second area, and spaced apart from the first area of the upper surface.

In a top plan view, the second area may surround the first area and may include a first sub-area and a second sub-area opposing each other in a first direction with respect to the first area of the upper surface, and a third sub-area and a fourth sub-area opposing each other a second direction which respect to the first area of the upper surface, the second direction crossing the first direction.

The protrusions may be arranged at the upper surface to be disposed in each of the first, second, third and fourth sub-areas.

The protrusions may be arranged at the upper surface to be disposed in only the first sub-area and the second sub-areas.

The third sub-area and the fourth sub-area may exclude the protrusions and may be flat.

The second area may include a first overlap area in which the first sub-area is overlapped with the third sub-area, a second overlap area in which the first sub-area is overlapped with the fourth sub-area, a third overlap area in which the second sub-area is overlapped with the third sub-area, and a fourth overlap area in which the second sub-area is overlapped with the fourth sub-area. The protrusions may be arranged at the upper surface to be disposed in each of the first, second, third and fourth overlap areas.

Adjacent protrusions among the protrusions in the second area of the upper surface may be respectively spaced apart from each other by a distance, and distances between the protrusions may be uniform within the second area of the upper surface.

The protrusions may have a same height as each other in a thickness direction of the light guide plate, and the height may be smaller than each of the distances.

The distance may be in a range from about 0.2 millimeter (mm) to about 0.8 mm, and the height may be in a range from about 0.01 mm to about 0.1 mm.

The light guide plate may further include a plurality of protrusion patterns arranged at the lower surface to overlap with the first area and the second area of the upper surface of the light guide plate.

In a top plan view, a distance between adjacent protrusion patterns among the protrusion patterns decreases as a distance from the light source increases and increases as the distance from the light source decreases.

The display device may further include a reflective sheet disposed facing the lower surface of the light guide plate, and the reflective sheet may be spaced apart from the lower surface by the protrusion patterns.

The protrusions may each have a shape different from a shape of each of the protrusion patterns.

The light guide plate may include a flat portion which defines a flat region of the upper surface, and the flat portion may extend to define the protrusions integral with the flat portion.

The optical sheet may include a diffusion sheet disposed contacting the protrusions and a prism sheet disposed on the diffusion sheet.

A material of the optical sheet may have a rigidity greater than a rigidity of a material of the light guide plate at the protrusions thereof.

Embodiments of the invention provide a light guide plate including a flat portion through which light is guided to a display panel which displays an image with light, the flat portion defining: an upper surface of the light plate, the upper surface including: a first area overlapped with a display area of the display panel, and a second area which is disposed adjacent to the first area and overlaps a non-display area of the display panel, a lower surface of the light guide plate facing the upper surface thereof, and a side surface of the light guide plate connecting the upper surface and the lower surface to each other; and a plurality of protrusions protruded from the upper surface of the flat portion to be disposed in the second area of the upper surface. In a top plan view, the second area of the upper surface includes: a first sub-area and a second sub-area opposing each other in a first direction with respect to the first area of the upper surface, and a third sub-area and a fourth sub-area opposing each other in a second direction with respect to the first area of the upper surface, the second direction crossing the first direction.

The protrusions may be arranged at the upper surface to be disposed in each of the first, second, third and fourth sub-areas.

The protrusions may be arranged at the upper surface to be disposed in only the first sub-area and the second sub-area.

The third sub-area and the fourth sub-areas of the upper surface exclude the protrusions and are flat.

Adjacent protrusions among the protrusions in the second area of the upper surface may be spaced apart from each other by a distance, and distances between the protrusions may be uniform within the second area of the upper surface.

According to one or more embodiment of the invention described above, the upper surface of the light guide plate includes or defines the first area in which the protrusions overlapped with the display area are not arranged and the second area in which the protrusions are arranged to overlap with the non-display area. Due to the protrusions arranged in the second area, a space is defined between the optical sheet and flat regions of the upper surface of the light guide plate.

As described above, even when the optical sheet and the light guide plate move relative to each other, since the flat regions of the upper surface of the light guide plate are spaced apart from the optical sheet, damage such as from scratching of the light guide plate and the optical sheet may be reduced or effectively prevented. As a result, a visibility of the image displayed by the display device may be improved.

BRIEF DESCRIPTION OF THE DRAWINGS

The above and other advantages of the present disclosure will become readily apparent by reference to the following detailed description when considered in conjunction with the accompanying drawings where:

FIGS. 6A to 6D are top plan views respectively showing exemplary embodiments of a light guide plate of a display device according to the invention;

DETAILED DESCRIPTION

Figure 1:
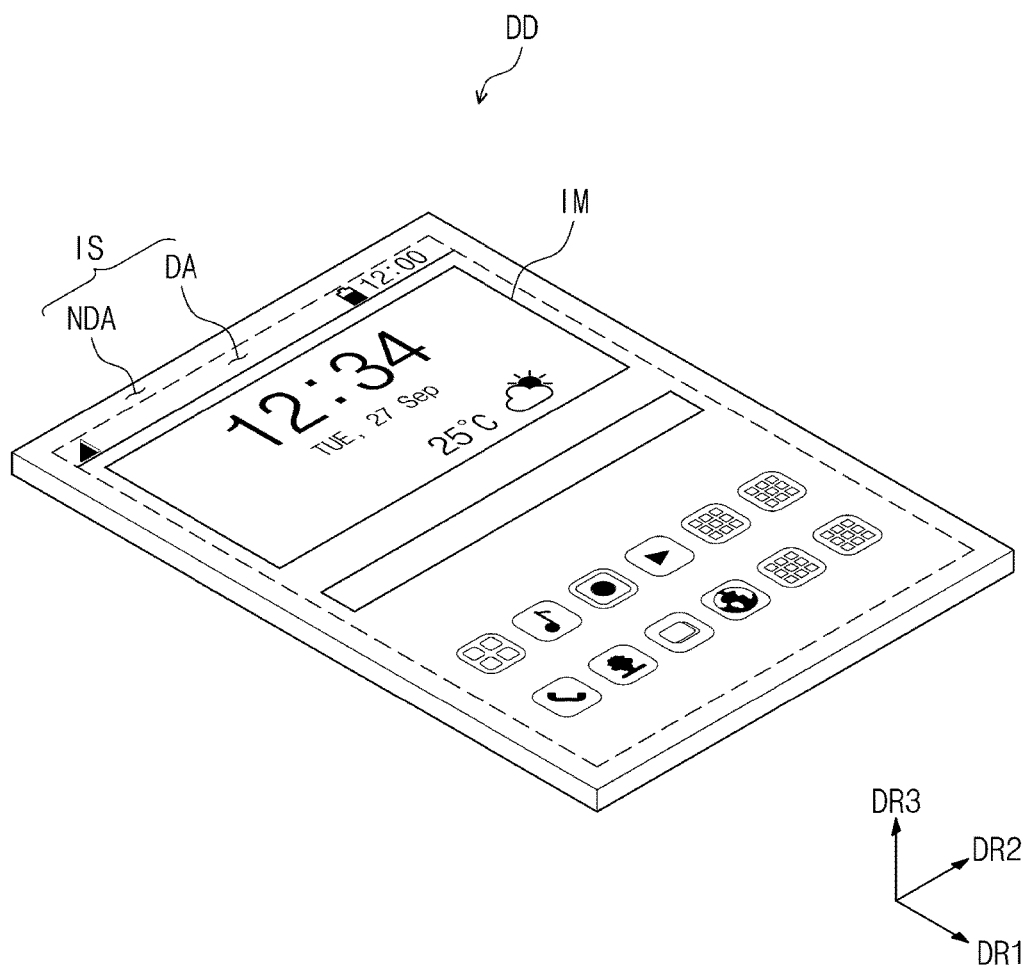
FIG. 1 is a perspective view showing an exemplary embodiment of a display device according to the invention.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

Like numbers refer to like elements throughout. In the drawings, the thickness of layers, films, and regions are exaggerated for clarity. As used herein, the term "and/or" includes any and all combinations of one or more of the associated listed items.

It will be understood that when an element is related to another element such as being referred to as being "on" another element, it can be directly on the other element or intervening elements may be present therebetween. In contrast, when an element is related to another element such as being referred to as being "directly on" another element, there are no intervening elements present.

The use of the terms first, second, etc. do not denote any order or importance, but rather the terms first, second, etc. are used to distinguish one element from another. Thus, a first element, component, region, layer or section discussed below could be termed a second element, component, region, layer or section without departing from the teachings of the present invention.

It is to be understood that the singular forms "a," "an," and "the" include plural referents unless the context clearly dictates otherwise, including "at least one," unless the content clearly indicates otherwise. "At least one" is not to be construed as limiting "a" or "an." "Or" means "and/or."

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Within a display device, for an optical sheet disposed between a display panel and a light guide plate, such as being directly arranged on the light guide plate, the light guide plate may have relatively small rigidity as compared to that of the optical sheet. When the optical sheet and the light guide plate move with respect to each other, the light guide plate having the relatively small rigidity may be scratched. In viewing the displayed image of the display device, the scratched mark on the light guide plate is undesirably perceived by a user. Therefore, an improved display device is desired in which damage to a light guide plate by an optical sheet is reduced or effectively prevented.

Figure 2:
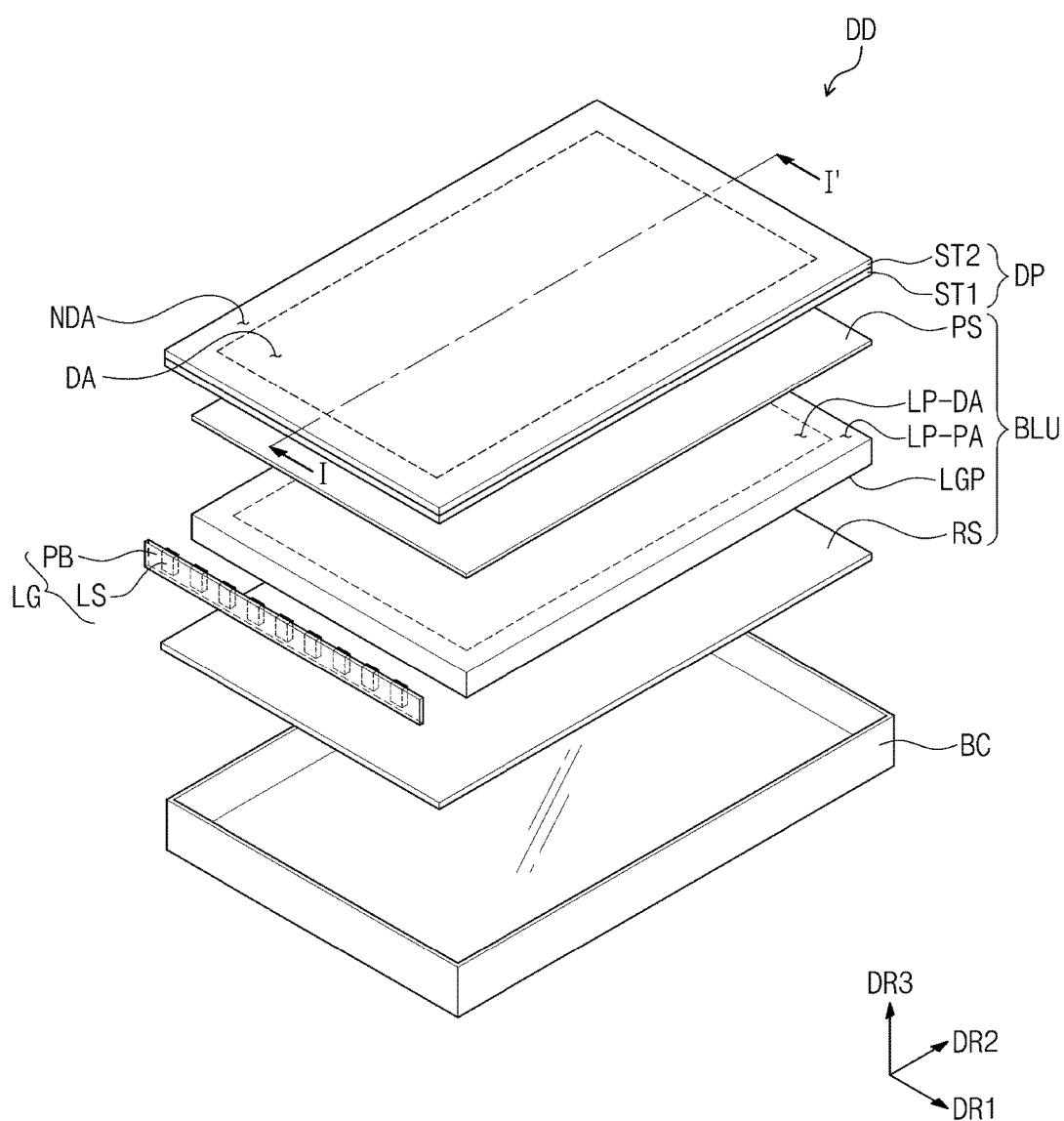
FIG. 2 is an exploded perspective view of the display device shown in FIG. 1.
Figure 3:
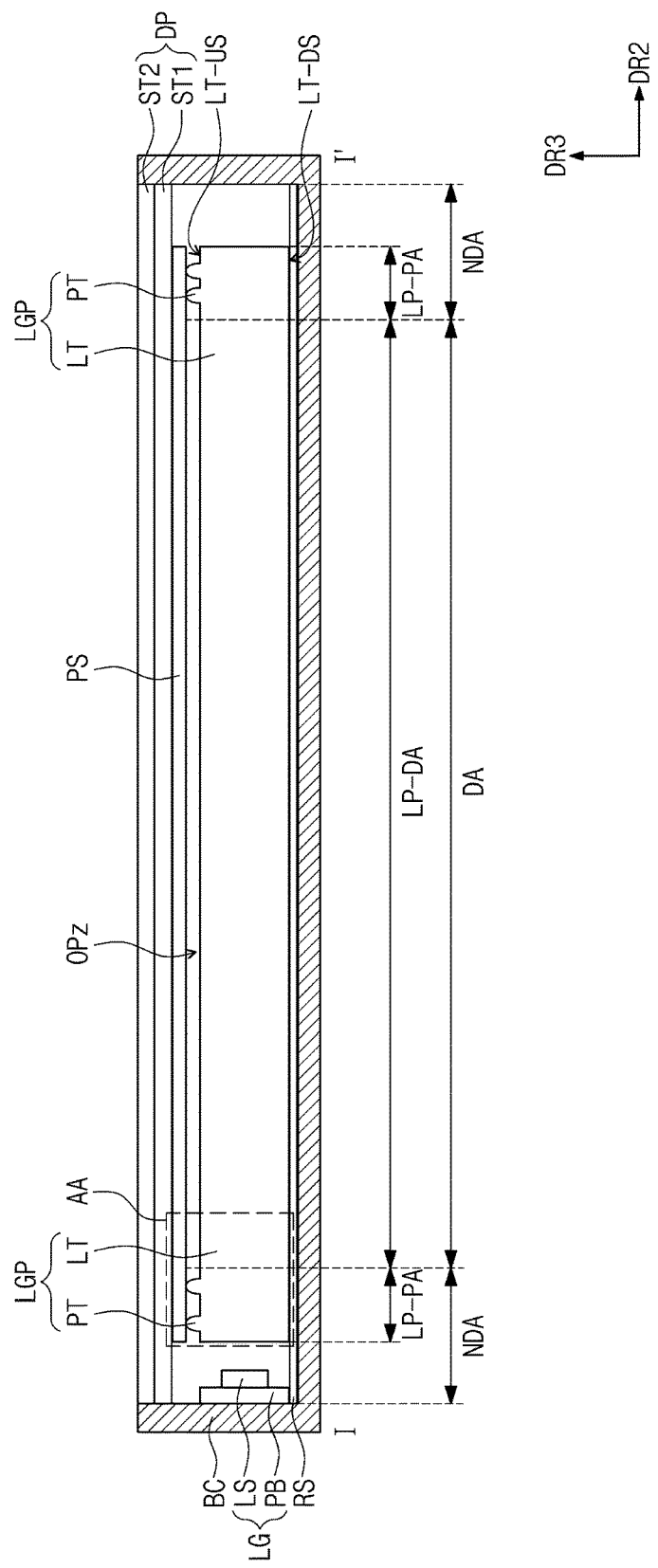
FIG. 3 is a cross-sectional view of the display device taken along line I-I' shown in FIG. 2.
Figure 4:
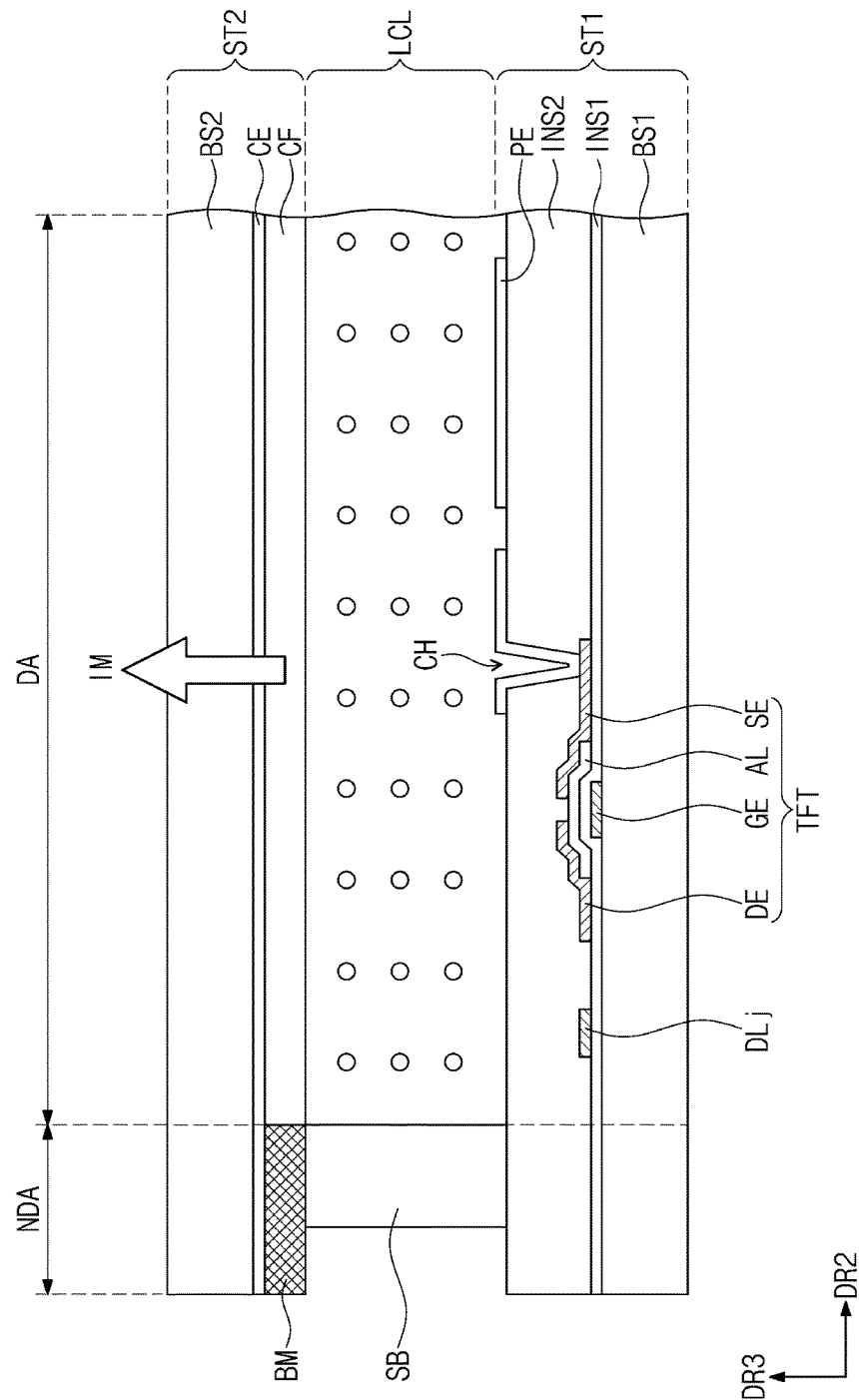
FIG. 4 is a cross-sectional view showing a portion of an exemplary embodiment of a display panel of a display device according to the invention.

FIG. 1 is a perspective view showing an exemplary embodiment of a display device according to the invention. FIG. 2 is an exploded perspective view of the display device shown in FIG. 2. FIG. 3 is a cross-sectional view of the display device taken along line I-I' shown in FIG. 2. FIG. 4 is a cross-sectional view showing a portion of an exemplary embodiment of a display panel of a display device according to the invention.

As an example of the present disclosure, a display device DD that may be applied to a portable electronic device such as a smart phone will be shown as an example. In addition, the display device DD may be applied to any of a number of electronic devices, such as a television set, a personal computer, a notebook computer, a car navigation unit, a game unit, a sound electronic device, a smart watch, a camera, etc. The display device DD may be applied to other electronic devices unless such application departs from the scope and spirit of the present disclosure.

Referring to FIG. 1, the display device DD includes a first display surface IS at which an image IM is displayed. The first display surface IS is disposed in a plane substantially parallel to a plane or surface defined by a first direction DR1 and a second direction DR2 which cross each other. A normal line direction relative to the display surface IS, e.g., a thickness direction of the display device DD, is indicated by a third direction DR3. For each member of the display device DD, a front surface (or an upper surface) is distinguished from a rear surface (or a lower surface) along the third direction DR3. However, the first to third directions DR1 to DR3 are relative terms to each other, and thus the first to third directions DR1 to DR3 may be changed to any other directions. Hereinafter, first to third directions correspond to directions respectively indicated by the first to third directions DR1 to DR3, and thus the first to third directions are assigned with the same reference numerals as those of the first to third directions DR1 to DR3.

The display surface IS of the display device DD may include a plurality of areas as defined by the display device DD or other component members thereof. The display device DD includes a display area DA at which the image IM is displayed and a non-display area NDA which is disposed adjacent to the display area DA. The image IM is not displayed in the non-display area NDA. A total of the display surface IS may be defined collectively by the display area DA and the non-display area NDA. As an exemplary of the image IM, FIG. 1 shows icons of applications (furthest in the first direction DR1) and a time window (surrounded by a solid line box from which the reference line for "IM" extends). The display area DA may have a quadrangular shape in a top plan view. As an example, the non-display area NDA may surround the display area DA in the top plan view. The shape of the display area DA may be designed relative to the shape of the non-display area NDA.

Although not shown in figures, the display device DD may include a window member through which light transmits to display the image IM and which defines the display surface IS, and a protective cover which is coupled with the window member. The protective cover may cover or overlap an entirety of the display device DD in the top plan view. In addition, a display panel may be accommodated in the protective cover, and the window may be coupled with the display panel accommodated in the protective cover. The window may include a material configured to pass light, and may be, but not limited to, a glass substrate or a plastic substrate. The protective cover may be, but not limited to, a plastic assembly, a metal assembly or a plastic-metal assembly as respectively included a plastic material, a metal material or a combination of plastic and metal materials.

Referring to FIGS. 2 and 3, the display device DD includes a display panel DP, a backlight unit BLU, an optical sheet PS and a bottom chassis BC.

The bottom chassis BC is disposed under the display panel DP and accommodates the display panel DP and the optical sheet PS therein. Although not shown in figures, the display device DD may further include a top chassis. The bottom chassis BC may be coupled with the top chassis. As an example, the top chassis is disposed above the display panel DP in the third direction DR3 and has an overall frame shape which defines an opening through which a displayed image is visible. As an example, the top chassis may have an overall shape covering at least one side surface of side surfaces of the display panel DP. In the following description, the display device DD from which the top chassis is omitted will be described.

The display panel DP may be disposed above the backlight unit BLU. The display panel DP may be, but not limited to, a liquid crystal display panel, a plasma display panel, an electrophoretic display panel, or a microelectromechanical system ("MEMS") display panel. Hereinafter, the liquid crystal display panel will be described as the display panel DP.

In addition, the display panel DP includes a display area DA and a non-display area NDA. Here, the display area DA of the display panel DP corresponds to the display area DA at which the image is displayed of the display surface IS of the display device DD shown in FIG. 1. Where the protective cover and the window member are omitted, the display panel DP may define the display surface IS of the display device DD. The non-display area NDA of the display panel DP corresponds to the non-display area NDA in which the image is not displayed of the display surface IS of the display device DD shown in FIG. 1. Driving circuits or elements which drive display circuits or elements of the display panel DP to display an image may be arranged in the non-display area NDA. The non-display area NDA may be referred to as a "bezel area".

The display panel DP includes a first display substrate ST1, a second display substrate ST2, an optical medium layer such as a liquid crystal layer LCL interposed between the first display substrate ST1 and the second display substrate ST2, and a sealing member SB interposed between the first display substrate ST1 and the second display substrate ST2.

Although not shown in figures, the first display substrate ST1 includes signal lines such as a plurality of gate lines and a plurality of data lines which cross the gate lines. In addition, the first display substrate ST1 includes a plurality of pixels connected to the gate lines and the data lines. The gate lines are connected to at least one gate driving circuit and respectively receive gate signals from the gate driving circuit. The data lines are connected to at least one data driving circuit and respectively receive data voltages from the data driving circuit.

Each of the pixels receives a corresponding data voltage among the data voltages in response to a corresponding gate signal among the gate signals. Each of the pixels is driven to display an image corresponding to the corresponding data voltage. In addition, the pixels are grouped into a plurality of groups. Each pixel may display one of primary colors. The primary colors include red, green, blue and white colors, but the primary colors may further include a variety of colors, e.g., yellow, cyan, magenta, etc.

In detail, the first display substrate ST1 includes a first base substrate BS1, a thin film transistor TFT and a pixel electrode PE. Each pixel may include the thin film transistor TFT and the pixel electrode PE. A gate electrode GE of the thin film transistor TFT is disposed on the first base substrate BS1. The first base substrate BS1 may be a transparent or non-transparent insulating substrate. As an example, the first base substrate BS1 may be, but not limited to, a silicon substrate, a glass substrate or a plastic substrate.

A first insulating layer INS1 is disposed on the first base substrate BS1 to cover the gate electrode GE. The first insulating layer INS1 may be referred to as a "gate insulating layer". The first insulating layer INS1 may be an inorganic insulating material including an inorganic material.

A semiconductor layer AL of the thin film transistor TFT is disposed on the first insulating layer INS1 covering the gate electrode GE.

A drain electrode DE and a source electrode SE of the thin film transistor TFT are arranged on the semiconductor layer AL and the first insulating layer INS1 to be spaced apart from each other. The semiconductor layer AL exposed between the drain and source electrodes DE and SE forms a conductive channel of the thin film transistor TFT between the source electrode SE and the drain electrode DE. In addition, a data line DLj which represents the previously-described data lines is arranged on the first insulating layer INS1. In this case, the gate line of which a portion thereof may form the gate electrode GE may be disposed on the first base substrate BS1 such that the gate line and portions thereof are insulated from the data lines by the first insulating layer INS1. In FIG. 4, the data line DLj is insulated from the gate electrode GE by the first insulating layer INS1.

A second insulating layer INS2 is disposed on the first insulating layer INS1 to cover the thin film transistor TFT and the data lines DLj. The second insulating layer INS2 may be referred to as a "passivation layer". According to the illustrated embodiment, the second insulating layer INS2 may be an organic insulating layer including an organic material. The second insulating layer INS2 covers an upper portion of the semiconductor layer AL, which is exposed.

In addition, a contact hole CH is defined through the second insulating layer INS2 to expose a predetermined area of the source electrode SE. In the display area DA, the pixel electrode PE is disposed on the second insulating layer INS2. A connection electrode branched from the pixel electrode PE is electrically connected to the source electrode SE of the thin film transistor TFT at the contact hole CH.

The second display substrate ST2 includes a second base substrate BS2, a color filter CF, a common electrode CE and a black matrix BM. In the illustrated embodiment, the color filter CF and the common electrode CE are arranged on the second base substrate BS2, but the invention is not limited thereto or thereby. That is, the color filter CF and the common electrode CE may be arranged within the first display substrate ST1 according to an alternative embodiment. Although not shown in figures, an insulating layer may further be disposed between the common electrode CE and the color filter CF.

Liquid crystal molecules included in the liquid crystal layer LCL may be controlled by a difference in electric field between the common electrode CE and the pixel electrode PE. That is, due to the difference in electric field between the common electrode CE and the pixel electrode PE, the liquid crystal layer LCL controls light transmittance therethrough to display the image IM at the display area DA.

In addition, the black matrix BM is disposed on the second base substrate BS2 to be overlapped with the non-display area NDA and to expose the display area DA. The black matrix BM reduces or effectively prevents the light from leaking outwardly through the non-display area NDA.

The sealing member SB is disposed to overlap with the non-display area NDA in the top plan view. The sealing member SB seals a space between the first display substrate ST1 and the second display substrate ST2 such as by coupling the first display substrate ST1 and the second display substrate ST2 to each other.

Referring to FIGS. 2 and 3 again, the backlight unit BLU includes an optical sheet PS, a light guide plate LGP, a reflective sheet RS, and a light source LG.

The light source LG is disposed adjacent to a side surface of the light guide plate LGP to provide the light to the light guide plate LGP. The light source LG includes a light emitting unit LS which generates and emits the light, and a circuit board PB on which the light emitting unit LS is disposed. According to the illustrated embodiment, the light source LG is provided in an edge-illumination structure in which the light is provided to the side surface of the light guide plate LGP. In detail, the circuit board PB has a shape defining a length thereof extending in the first direction DR1. The light emitting unit LS is provided in a plural number on the circuit board PB, and the light emitting units LS are arranged in the first direction DR1. The light emitting units LS are arranged in the first direction DR1 and provide the light to the side surface of the light guide plate LGP, along the second direction DR2.

In the illustrated embodiment, the light source LG is disposed adjacent to the side surface of the light guide plate LGP, but should not be limited thereto or thereby. That is, although not shown in figures, the display device DD may further include a second light source at another side surface of the light guide plate LGP. The second light source may be disposed to face the light source LG in the second direction DR2 such that the light guide plate LGP is disposed between the second light source and the light source LG. In this case, the light source LG may provide the light to a first side surface of the light guide plate LGP, and the second light source may provide the light to a second side surface of the light guide plate LGP which is opposite to the first side surface thereof in the second direction DR2.

The optical sheet PS is disposed between the display panel DP and the light guide plate LGP. According to the illustrated embodiment, the optical sheet PS may include a diffusion sheet diffusing the light incident thereto or a prism sheet condensing the light. However, the optical sheet PS may collectively include plural individual sheets.

The light guide plate LGP is disposed between the optical sheet PS and the reflective sheet RS. The light guide plate LGP guides the light emitted from the light source LG to the display panel DP.

According to the illustrated embodiment, the light guide plate LGP includes a flat portion LT and a protrusion portion connected to and extended from the flat portion LT. The flat portion LT may form a base of the light guide plate LGP from which a portion thereof may be protruded. The flat portion LT may define flat regions of a surface of the light guide plate LGP. The flat portion LT includes or defines an upper surface LT-US, a lower surface LT-DS, and a side surface connecting the upper surface LT-US and the lower surface LT-DS to each other. The upper surface LT-US faces the optical sheet PS, and the lower surface LT-DS faces the reflective sheet RS. The light guide plate LGP receives the light through the side surface thereof and provides the light to the optical sheet PS through portions of the upper surface LT-US.

According to the illustrated embodiment, the upper surface LT-US includes or defines a first area LP-DA and a second area LT-PA. The first area LP-DA of the light guide plate LGP may be overlapped with the display area DA defined by the display panel DP in the top plan view. That is, the first area LP-DA of the light guide plate LGP may correspond to the display area DA of the display panel DP. The first area LP-DA and the second area LT-PA may collectively define an entirety of the light guide plate LGP in the top plan view.

The second area LP-PA of the light guide plate LGP is disposed adjacent to the first area LP-DA and overlapped with the non-display area NDA defined by the display panel DP in the top plan view. In the illustrated exemplary embodiment, the second area LP-PA surrounds the first area LP-DA such as in the top plan view. An entirety of the second area LP-PA may be overlapped with the non-display area NDA having a greater planar area than the second area LP-PA as shown in FIG. 3. However, according to alternative embodiments, only a portion of the second area LP-PA may be overlapped with the non-display area NDA in the top plan view, or a planar area of the second area LP-PA may be substantially the same as a planar area of the non-display area NDA, according to sizes of the display panel DP and the light guide plate LGP.

According to the above, the light guide plate LGP may provide the light to the optical sheet PS through the first area LP-DA and the second area LP-PA of the upper surface LT-US. In this case, where portions of the second area LP-PA and the black matrix BM are disposed in the non-display area, the light exiting through the second area LP-PA may be blocked by the black matrix BM shown in FIG. 4. That is, the light exiting through the first area LP-DA is provided to the display panel DP through the optical sheet PS, and thus the image is displayed at the display area DA of the display panel DP.

In a conventional display device, the light guide plate has only a flat region as an upper surface of the light guide plate without including a protrusion part. In this case, the flat region as the upper surface directly makes contact with the optical sheet which faces the upper surface of the light guide plate. As a result, in a case that the optical sheet and the light guide plate move with respect to each other such as in the second direction DR2, the upper surface of the light guide plate is undesirably scratched. Since the optical sheet has a rigidity greater than that of the light guide plate, the upper surface of the light guide plate is undesirably damaged by such scratching. Accordingly, an efficiency of the light provided to the display panel from the light guide plate through the scratched upper surface of the light guide plate is deteriorated.

According to one or more embodiment of the invention, the protrusion portion of the light guide plate LGP may collectively include a protrusion PT provided in plurality. The protrusion portion of the light guide plate LGP may collectively include a protrusion PT provided in plurality and flat regions (if any) of the upper surface LT-US disposed between and/or around the protrusions PT. The protrusions PT may be arranged at the upper surface LT-US to overlap with the second area LP-PA. The optical sheet PS is supported on the light guide plate LGP by the protrusions PT thereof and is spaced apart from flat regions of the upper surface LT-US of the light guide plate LGP by the protrusions PT. That is, a space OPz may be defined between flat regions of the upper surface LT-US of the light guide plate LGP and the optical sheet PS by the protrusions PT. Accordingly, although the light guide plate LGP and the optical sheet PS move with respect to each other such as in the second direction DR2 or in a plane defined with the second direction DR2, the upper surface LT-US of the light guide plate LGP through which light is transmitted may not be damaged.

As described above, the protrusions PT are arranged at the upper surface LT-US to overlap with the second area LP-PA, but the protrusions PT are not arranged (e.g., are excluded) in the first area LP-DA. That is, the first area LP-DA may include only a flat region of the light guide plate LGP. As a result, the light uniformly exits from the upper surface LT-US through the first area LP-DA. That is, in a case that the protrusions PT are arranged in the first area LP-DA, a direction in which the light travels may be changed by the protrusions PT arranged in the first area LP-DA. Thus, with the protrusions PT arranged in the first area LP-DA, the light provided to the display panel DP through the optical sheet PS is not uniform. In addition, when the protrusions PT are not arranged in the first area LP-DA, a manufacturing time of the display device DD may be shortened, and a manufacturing cost of the display device DD may be reduced.

Accordingly, the protrusions according to one of more embodiment may be arranged at the upper surface LT-US to overlap only with the second area LP-PA. The light guide plate LGP will be described in detail later.

The reflective sheet RS may be disposed between the light guide plate LGP and the bottom chassis BC. The reflective sheet RS may reflect the light provided from the lower surface LT-DS of the light guide plate LGP to the upper surface LT-US of the light guide plate LGP. According to the illustrated embodiment, the reflective sheet RS may be disposed to make contact with the lower surface LT-DS of the light guide plate RS. However, the reflective sheet RS may be disposed on the bottom chassis BC to be spaced apart from the lower surface LT-DS of the light guide plate LGP.

Figure 5:
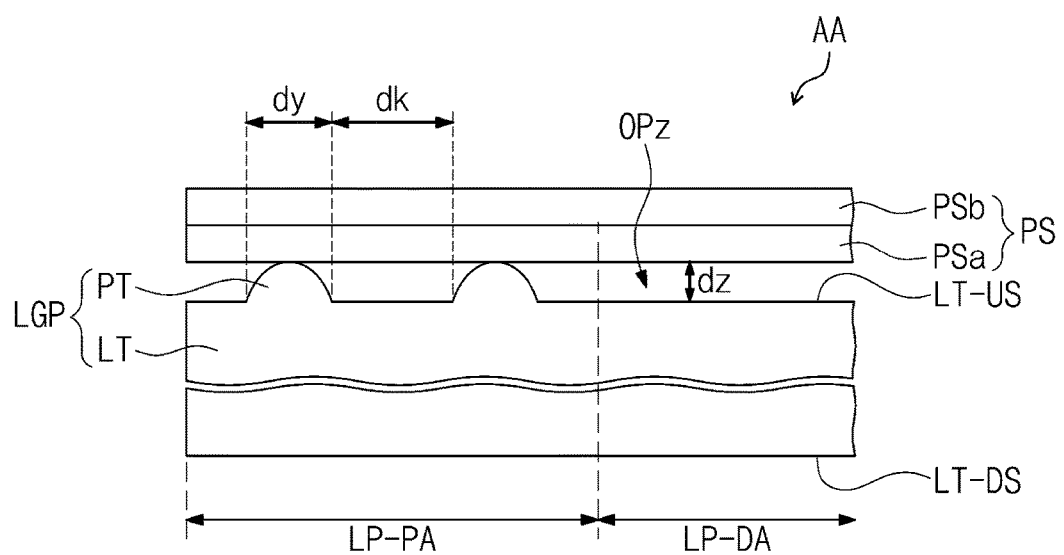
FIG. 5 is an enlarged cross-sectional view showing portion "AA" of the display device shown in FIG. 3.

FIG. 5 is an enlarged cross-sectional view showing portion "AA" of the display device shown in FIG. 3. Referring to FIG. 5, the light guide plate LGP includes the flat portion LT and the protrusion portion, and the protrusion portion includes the protrusions PT. FIG. 5 shows flat regions of the upper surface LT-US adjacent to and between the protrusions PT, but the invention is not limited thereto or thereby. In particular, the protrusions PT are arranged at the upper surface LT-US to overlap with the second area LP-PA, but the protrusions PT are not overlapped with (e.g., are excluded from) the first area LP-DA.

According to the illustrated embodiment, the protrusions PT may be provided in an integral shape with the flat portion LT. That is, the protrusions PT may be a protruded portion of the flat regions of the light guide plate LGP at the upper surface LT-US thereof. As an example, each protrusion PT may have a half-circular shape in cross-section as shown in FIG. 5, but the shape of the protrusions PT should not be limited to the half-circular shape. The shape of the protrusions PT may be changed according to embodiments. For instance, each protrusion PT may have various shapes, e.g., a triangular shape, an oval shape, a quadrangular shape, etc. in cross-section. That is, the protrusions PT may have various shapes in cross-section to separate the optical sheet PS from the flat regions of the upper surface LT-US of the light guide plate LGP.

Each protrusion PT has a width dy which decreases as a distance from the optical sheet PS decreases and as a distance from the flat regions of the upper surface LT-US increases. Here, the width dy of the protrusions PT may be defined in the first direction DR1 and/or the second direction DR2 shown in FIG. 2. At a distal end of an individual protrusion PT, a planar area of the protrusion PT which contacts the optical sheet PS is relatively small as compared to a planar area of the protrusion PT at the base thereof (e.g., coplanar with the flat regions of the upper surface LT-US. As a planar area of the protrusions PT making contact with the optical sheet PS becomes relatively small, damage to the protrusions PT may be reduced or effectively prevented.

However, according to embodiments, the width dy of the protrusions PT making contact with the upper surface LT-US (e.g., coplanar with the flat regions thereof) may be substantially the same as the width dy of the protrusions PT making contact with the optical sheet PS at the distal end of the protrusions PT. That is, the protrusions PT may have various shapes depending on the width dy of the protrusions PT at the flat regions of the upper surface LT-US.

According to one or more of the illustrated embodiments, the protrusions PT may have the same height dz as each other in the thickness direction of the light guide plate LGP. Here, the thickness direction may be the third direction DR3. In addition, adjacent protrusions PT among the protrusions PT in the second area LP-PA are spaced apart from each other at a distance dk. The distances dk within the second are LP-PA are uniform distance. While the distance dk in FIG. 5 is shown relative to the second direction DR2 (as portion AA in FIG. 3), the protrusions PT may be spaced apart from each other at a uniform distance dk in the first direction DR1 and/or the second direction DR2. The height dz of the protrusions PT may be smaller than the distance dk between adjacent protrusions PT. However, the distance dk between the adjacent protrusions PT may not be uniform according to embodiments. The distance dk between the adjacent protrusions PT may define a length of a flat region therebetween, in the respective first direction DR1 or second direction DR2.

In an exemplary embodiment, for instance, the height dz of the protrusions PT may be in a range from about 0.01 millimeter (mm) to about 0.1 mm. in addition, the distance dk between the protrusions PT may be in a range from about 0.2 mm to about 0.8 mm.

As described above, the optical sheet PS may include a collection of individual sheets such as a diffusion sheet PSa and a prism sheet PSb. In this case, the diffusion sheet PSa is disposed on the protrusions PT to face the upper surface LT-US of the light guide plate LGP. The prism sheet PSb is disposed on the diffusion sheet PSa to face the display panel DP (refer to FIG. 2). FIG. 5 shows one prism sheet PSb, but the number of the prism sheet PSb should not be limited to one. That is, the prism sheet PSb may include a plurality of individual prism sheets such as an upper prism sheet and a lower prism sheet. In other words, the prism sheet PSb may be provided in a plural number.

FIGS. 6A to 6D are top plan views respectively showing exemplary embodiments of a light guide plate according to the invention.

Referring to FIGS. 6A to 6D, the upper surface LT-US (refer to FIG. 3) of each light guide plate LGP includes the first area LP-DA and the second area LP-PA which is adjacent to the first area LP-DA. Particularly, the second area LP-PA may include first, second, third and fourth sub-areas LP-PA1, LP-PA2, LP-PA3 and LP-PA4. That is, the upper surface LT-US of the light guide plate LGP has the overall quadrangular shape, and the second area LP-PA surrounding the first area LP-DA may include the first, second, third, and fourth sub-areas LP-PA1, LP-PA2, LP-PA3, and LP-PA4.

Each of the first and second sub-areas LP-PA1 and LP-PA2, defines a length thereof extended in the first direction DR1. Each of the third and fourth sub-areas LP-PA3 and LP-PA4 defines a length thereof extended in the second direction DR2. A width of a respective sub-area is taken perpendicular to the length thereof, such as extending from a respective outer edge of the light guide plate LGP toward the flat portion LT which includes only a flat region. A sub-area is shown in FIGS. 6A to 6D bounded by outer edges of the light guide plate LGP and a dotted line along the length of the sub-area.

The first sub-area LP-PA1 may be partially overlapped with each of the third sub-area LP-PA3 and the fourth sub-area LP-PA4. In this case, the area in which the first sub-area LP-PA1 is overlapped with the third sub-area LP-PA3 is referred to as a first overlap area S13, and the area in which the first sub-area LP-PA1 is overlapped with the fourth sub-area LP-PA4 is referred to as a second overlap area S14.

In addition, the second sub-area LP-PA2 may be partially overlapped with the third sub-area LP-PA3 and the fourth sub-area LP-PA4. In this case, the area in which the second sub-area LP-PA2 is overlapped with the third sub-area LP-PA3 is referred to as a third overlap area S23, and the area in which the second sub-area LP-PA2 is overlapped with the fourth sub-area LP-PA4 is referred to as a fourth overlap area S24.

The first sub-area LP-PA1 faces the second sub-area LP-PA2 in the second direction DR2 with respect to the first area LP-DA, and the third sub-area LP-PA3 faces the fourth sub-area LP-PA4 in the first direction DR1 with respect to the first area LP-DA.

Figure 6A:
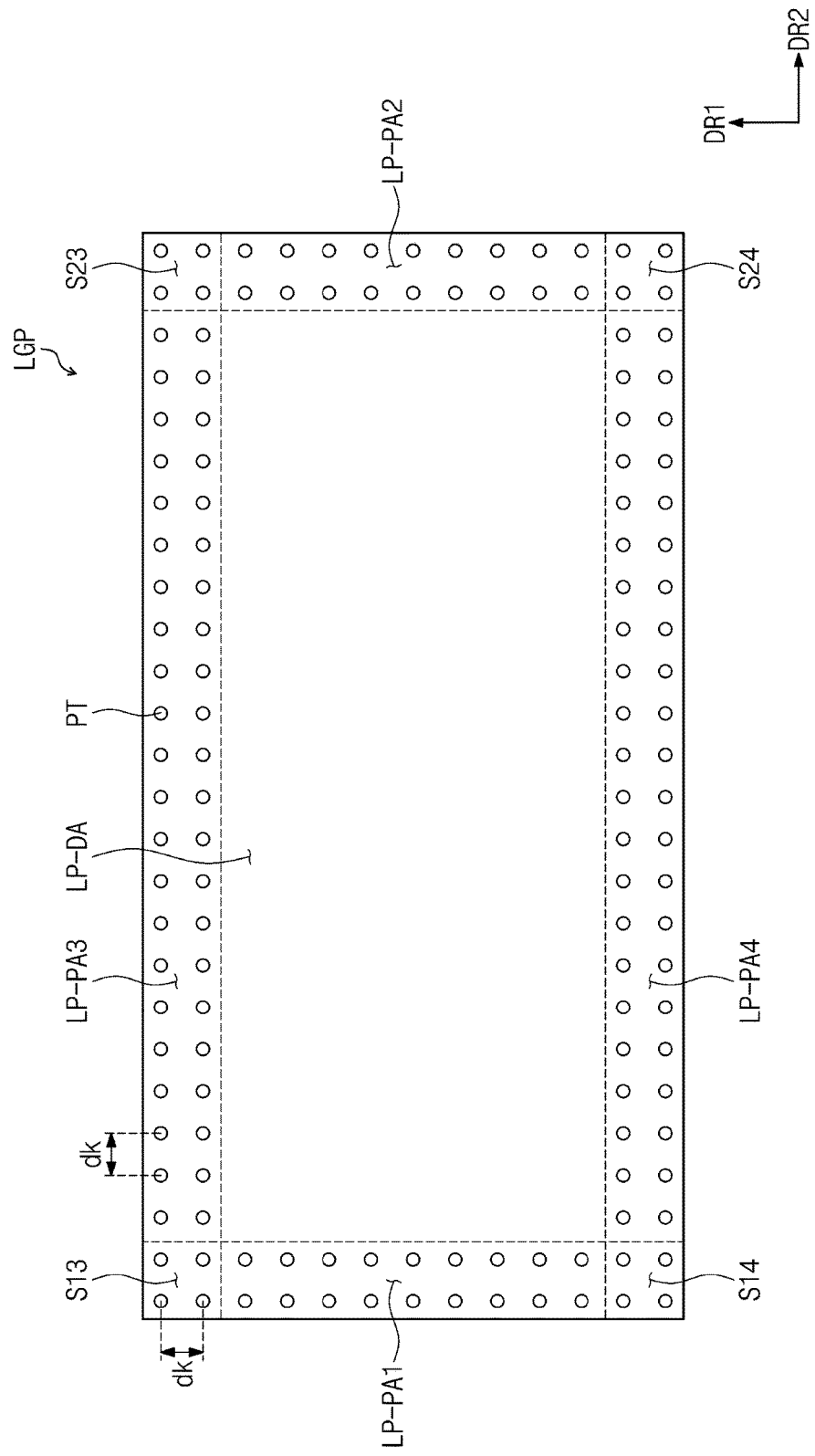

Referring to FIG. 6A, the protrusions PT may be arranged at the upper surface LT-US of the light guide plate LGP to be disposed in the first, second, third and fourth sub-areas LP-PA1, LP-PA2, LP-PA, and LP-PA4. That is, the protrusions PT may be protruded from flat regions of the upper surface LT-US of the light guide plate LGP to be disposed in the first, second, third and fourth sub-areas LP-PA1, LP-PA2, LP-PA3 and LP-PA4. That is, a protrusion portion of the light guide plate LGP is disposed extended from each outer edge of the light guide plate LGP in the top plan view.

In this case, the protrusions PT are spaced apart from each other at the uniform distance dk in first and second directions DR1 and DR2 and arranged in the first, second, third and fourth sub-areas LP-PA1, LP-PA2, LP-PA3 and LP-PA4. In an exemplary embodiment, for instance, the protrusions PT are spaced apart from each other at the uniform distance dk in the first direction DR1. The protrusions PT are spaced apart from each other at the uniform distance dk in the second direction DR2.

Figure 6B:
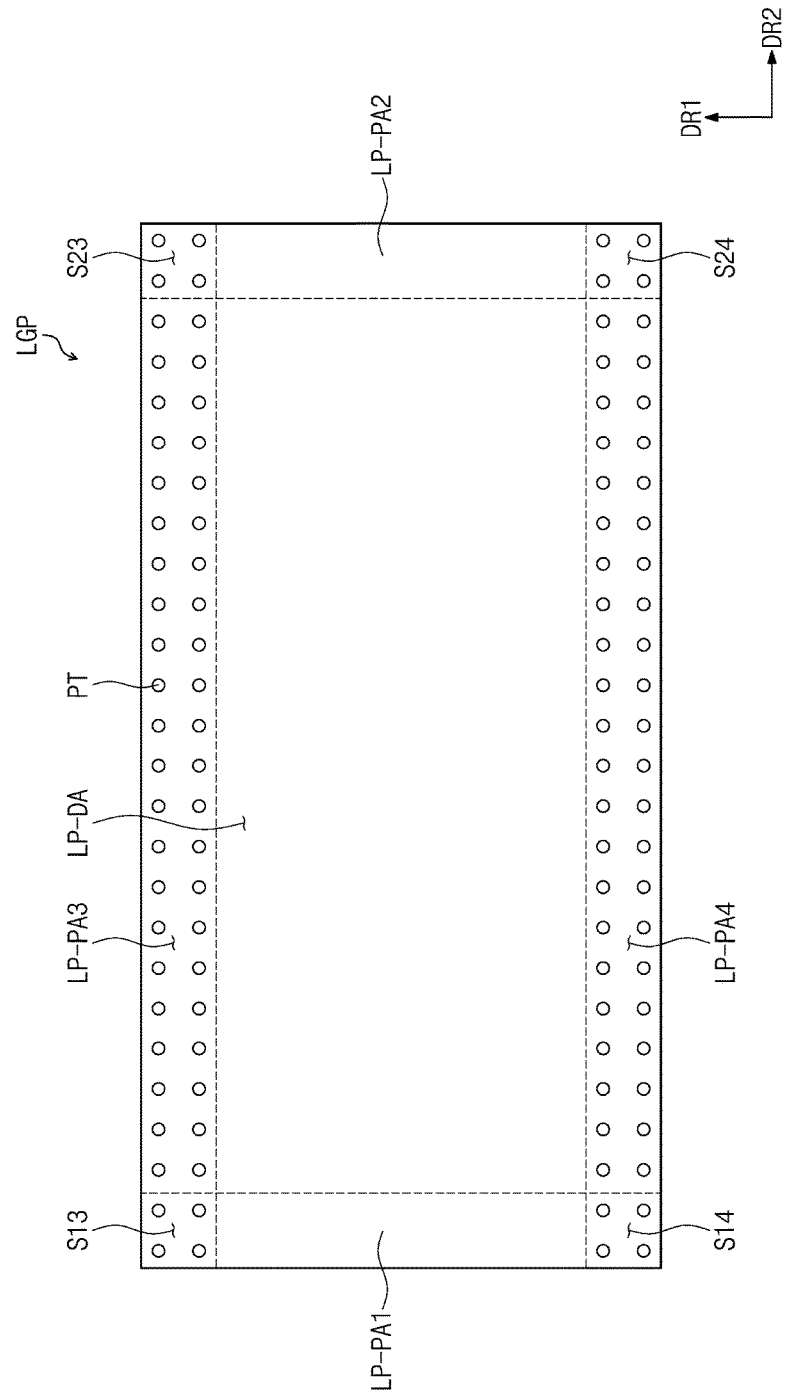

Referring to FIG. 6B, the protrusions PT may be arranged at the upper surface LT-US of the light guide plate LGP to be disposed in the third and fourth sub-areas LP-PA3 and LP-PA4 which lengthwise extend to include an entirety of the length of the light guide plate LGP at a respective outer edge thereof. That is, the protrusions PT may be protruded from flat regions of the upper surface LT-US of the light guide plate LGP to be disposed in the third and fourth sub-areas LP-PA3 and LP-PA4.

In this case, the protrusions PT may not be arranged in (e.g., may be excluded from) portions of the first and second sub-areas LP-PA1 and LP-PA2 which lengthwise extend between the third and fourth sub-areas LP-PA3 and LP-PA4. That is, the upper surface LT-US of the light guide plate LGP may be flat (e.g., include only a flat region) at the portions of the first and second sub-areas LP-PA1 and LP-PA2 which lengthwise extend between the third and fourth sub-areas LP-PA3 and LP-PA4. Similarly, within the third and fourth sub-areas LP-PA3 and LP-PA4, the protrusions PT may be arranged at the upper surface LT-US to be spaced apart from each other at the uniform distance in the first and second directions DR1 and DR2.

In the illustrated embodiment, the protrusions PT are not arranged in the portions of the first and second sub-areas LP-PA1 and LP-PA2 which lengthwise extend between the third and fourth sub-areas LP-PA3 and LP-PA4, but the protrusions PT may be arranged in each of the first, second, third and fourth overlap areas S13, S14, S23 and S24. That is, the upper surface LT-US may be flat in the first and second sub-areas LP-PA1 and LP-PA2 except for portions thereof defined by the first, second, third and fourth overlap areas S13, S14, S23 and S24.

Referring to FIG. 6C, the protrusions PT may be arranged at the upper surface LT-US of the light guide plate LGP to be disposed in the first and second sub-areas LP-PA1 and LP-PA2 which lengthwise extend to include an entirety of the width of the light guide plate LGP which is smaller than the length thereof, at a respective outer edge thereof. That is, the protrusions PT may be protruded from flat regions of the upper surface LT-US of the light guide plate LGP to be disposed in the first and second sub-areas LP-PA1 and LP-PA2.

In this case, the protrusions PT may not be arranged in (e.g., may be excluded from) portions of the third and fourth sub-areas LP-PA3 and LP-PA4 which lengthwise extend between the first and second sub-areas LP-PA1 and LP-PA2. That is, the upper surface LT-US of the light guide plate LGP may be flat (e.g., include only a flat region) at the portions of the third and fourth sub-areas LP-PA3 and LP-PA4 which lengthwise extend between the first and second sub-areas LP-PA1 and LP-PA2. Similarly, within the first and second sub-areas LP-PA1 and LP-PA2, the protrusions PT may be arranged at the upper surface LT-US to be spaced apart from each other at the uniform distance in the first and second directions DR1 and DR2.

In the illustrated embodiment, the protrusions PT are not arranged in the portions of the third and fourth sub-areas LP-PA3 and LP-PA4 which lengthwise extend between the first and second sub-areas LP-PA1 and LP-PA2, but the protrusions PT may be arranged in the first, second, third and fourth overlap areas S13, S14, S23 and S24. That is, the upper surface LT-US may be flat in the third and fourth sub-areas LP-PA3 and LP-PA4 except for portions thereof defined by the first, second, third and fourth overlap areas S13, S14, S23, and S24.

Figure 6D:
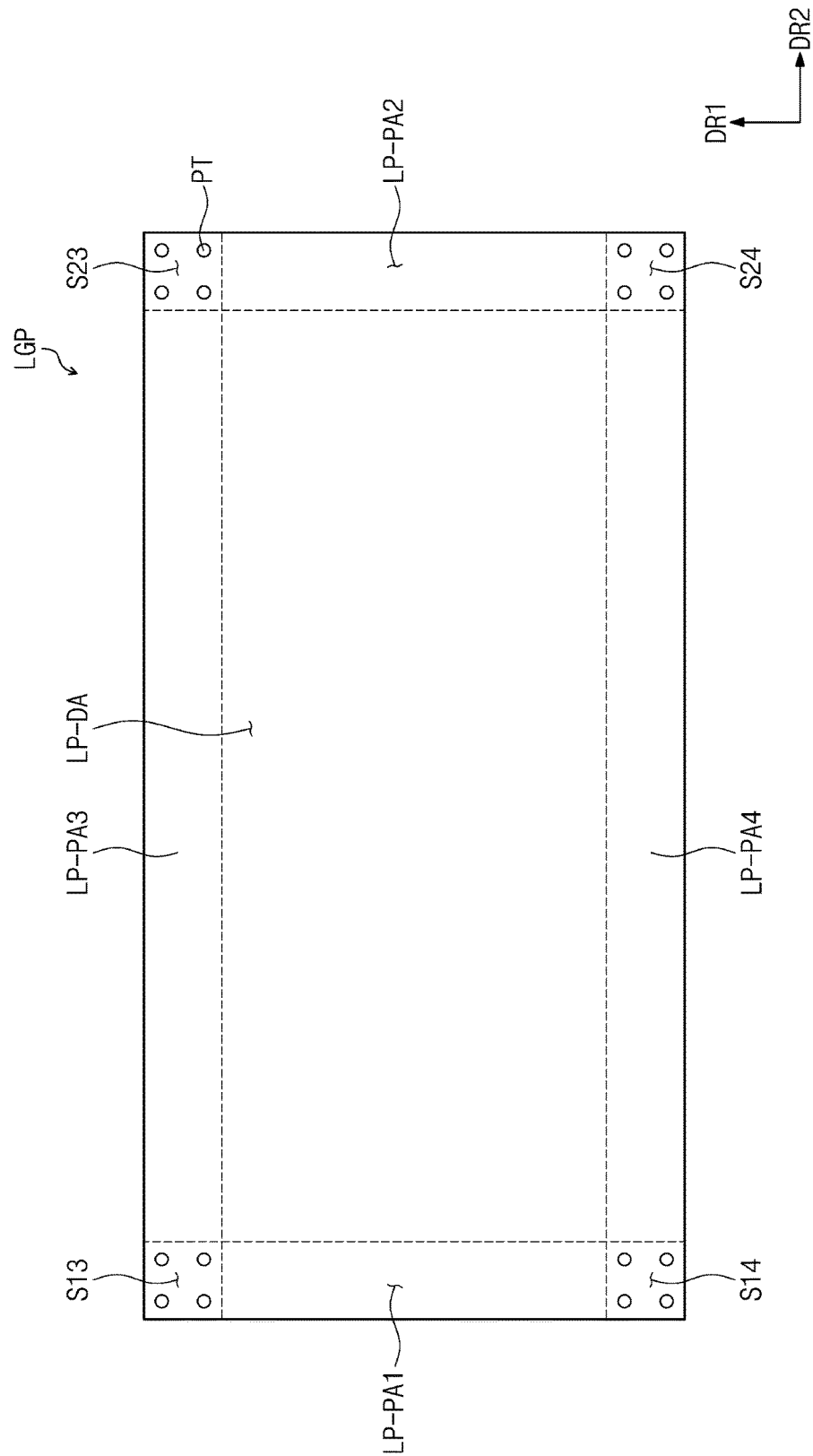

Referring to FIG. 6D, the protrusions PT may be arranged only in the first, second, third and fourth overlap areas S13, S14, S23 and S24 at respective corners of the light guide plate LGP. As described above, the protrusions PT may be arranged at the upper surface LT-US of the light guide plate LGP in various ways.

Figure 7:
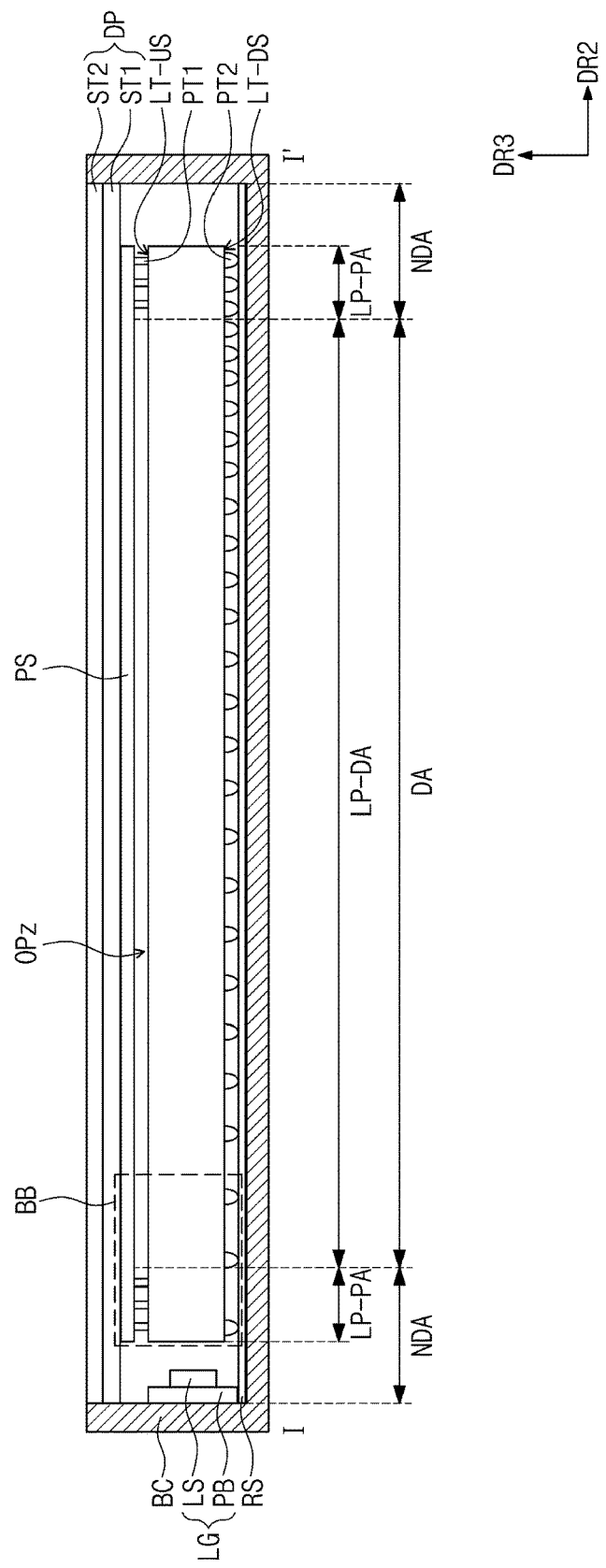
FIG. 7 is a cross-sectional view of another exemplary embodiment of a display device taken along line I-I' shown in FIG. 2.
Figure 8:
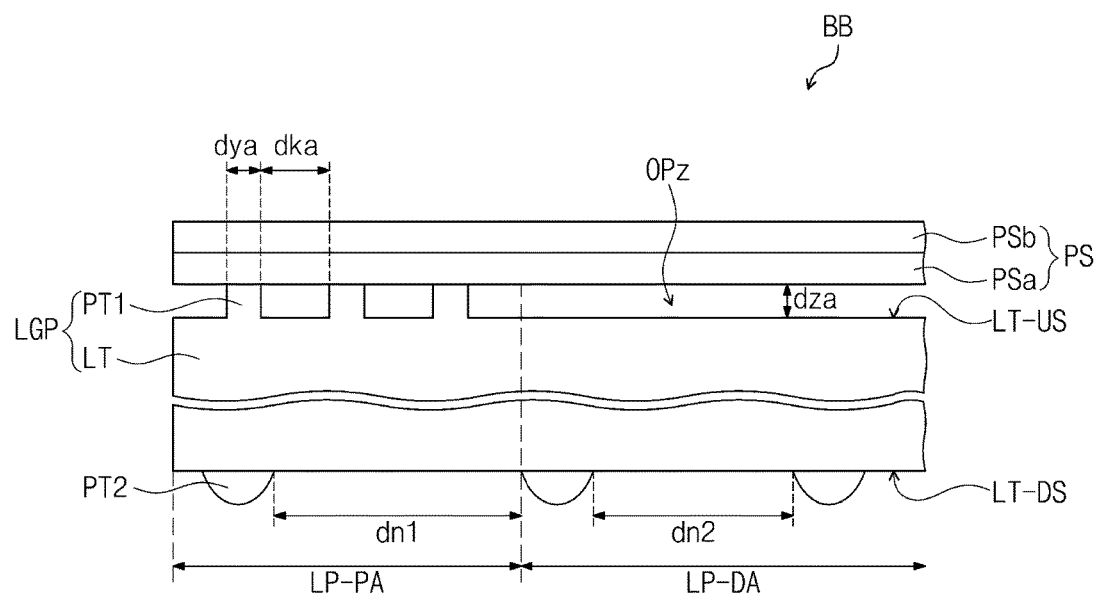
FIG. 8 is an enlarged cross-sectional view showing portion "BB" of the display device shown in FIG. 7.

FIG. 7 is a cross-sectional view of another exemplary embodiment of a display device taken along line I-I' shown in FIG. 2, and FIG. 8 is an enlarged cross-sectional view showing portion "BB" of the display device shown in FIG. 7.

The display device shown in FIG. 7 may have the same structure and function as those of the display device DD shown in FIG. 3 except for a light guide plate LGP. Accordingly, detailed descriptions of the same elements will be omitted.

Referring to FIGS. 7 and 8, the light guide plate LGP may include a flat portion LT and first and second protrusion portions connected to and extended from the flat portion LT. The flat portion LT includes an upper surface LT-US, a lower surface LT-DS, and a side surface connecting the upper surface LT-US and the lower surface LT-DS to each other. The upper surface LT-US faces the optical sheet PS, and the lower surface LT-DS faces the reflective sheet.

Although not shown, the first protrusion portion and the second protrusion portion can be disposed on the flat portion LT by using a mold. In detail, in order to form the first protrusion portion and the second protrusion portion on the flat portion LT, the mold may be disposed on the flat portion LT. The mold may have a thickness. The thickness of the mold corresponds to a thickness of the first protrusion portion and the second protrusion portion. Also, a plurality of holes overlapping the first protrusion portion and the second protrusion portion may be defined in the mold. That is, as the material is injected into the holes defined in the mold, the first protrusion portion and the second protrusion portion can be disposed and connected on the flat portion LT. Here, the material used to fabricate the first protrusion portion and the second protrusion portion may be the same as the material of the LGP, but it is not limited thereto and various materials can be used.

According to the illustrated embodiment, the upper surface LT-US includes or defines a first area LP-DA and a second area LP-PA which is disposed adjacent to the first area LP-DA. The first area LP-DA of the light guide plate LGP is overlapped with the display area DA defined by the display panel DP in the top plan view. That is, the first area LP-DA may substantially the same as the display area DA of the display panel DP. The first area LP-DA and the second area LT-PA may collectively define an entirety of the light guide plate LGP in the top plan view.

The second area LP-PA of the light guide plate LGP is disposed adjacent to the first area LP-DA and overlapped with the non-display area NDA defined by the display panel DP in the top plan view. In the illustrated exemplary embodiment, the second area LP-PA surrounds the first area LP-DA, such as in the top plan view. An entirety of the second area LP-PA may be overlapped with the non-display area NDA having a greater planar area than the second area LP-PA as shown in FIG. 7. However, according to alternative embodiments, only a portion of the second area LP-PA may be overlapped with the non-display area NDA in the top plan view, or a planar area of the second area LP-PA may be substantially the same as a planar area of the non-display area NDA, according to sizes of the display panel DP and the light guide plate LGP.

According to the illustrated embodiment, the first protrusion portion may be arranged at the upper surface LT-US to overlap with the second area LP-PA. Here, the first protrusion portion may collectively include a protrusion PT1 provided in plurality. The first protrusion portion of the light guide plate LGP may collectively include a protrusion PT provided in plurality and flat regions (if any) of the upper surface LT-US disposed between and/or around the protrusions PT1. Due to a height dza of the protrusions PT1, a space OPz may be defined between the optical sheet PS and the flat regions of the light guide plate LGP. As an example, each protrusion PT1 may have a quadrangular shape when viewed in cross section as shown in FIG. 8.

Each protrusion PT1 has a width dya. Here, the width dya of the protrusions PT1 may be defined in the first direction DR1 and/or the second direction DR2 shown in FIG. 2. The width dya of the protrusions PT1 making contact with the upper surface LT-US (e.g., coplanar with the flat regions thereof) may be substantially the same as the width dya of the protrusions PT1 making contact with the optical sheet PS at the distal end of the protrusions PT1.

According to the illustrated embodiment, the second protrusion portion may be arranged at the lower surface LT-DS to overlap with the first area LP-DA and the second area LP-PA. Here, the second protrusion portion may include a protrusion pattern PT2 provided in plurality. A base of the protrusion patterns PT2 is coplanar with flat regions of the lower surface LT-DS. The second protrusion portion of the light guide plate LGP may collectively include a protrusion PT2 provided in plurality and flat regions (if any) of the lower surface LT-DS disposed between and/or around the protrusions PT2. Similar to the above, due to the protrusion patterns PT2, a space may be defined between the reflective sheet RS and flat regions of the lower surface LT-DS. As an example, each protrusion pattern PT2 may have a half-circular shape when viewed in cross section as shown in FIG. 8.

As described above, the protrusions PT1 may have the different shape in cross-section from that of the protrusion patterns PT2. As shown in the cross-sectional view of FIG. 7, each protrusion PT1 has the rectangular shape, and each protrusion pattern PT2 has the half-circular shape. However, the protrusions PT1 may have the same shape as that of the protrusion patterns PT2 according to other embodiments.

The protrusions PT1 are spaced apart from each other at a distance dka. While the distance dka in FIG. 8 is shown relative to the second direction DR2 (as portion BB in FIG. 7), the protrusions PT1 may be spaced apart from each other at a uniform distance dka in the first direction DR1 and/or the second direction DR2. However, the distance dka between the adjacent protrusions PT1 may not be uniform according to embodiments. The distance dka between the adjacent protrusions PT1 may define a length of a flat region therebetween, in the respective first direction DR1 or second direction DR2.

According to the illustrated embodiment, the protrusions PT1 are spaced apart from each other at a uniform distance in the second area LP-PA. In contrast, the protrusion patterns PT2 are spaced apart from each other at different distances in the first area LP-DA and in the second area LP-PA. In particular, the distance between adjacent protrusion patterns PT2 may become smaller as a distance from the light source LG disposed adjacent to the side surface of the light guide plate LGP increases. In other words, the distance between the protrusion patterns PT2 may increase as the distance from the light source LG decreases.

In an exemplary embodiment, for instance, a distance between two first protrusion patterns PT2 adjacent to each other among the protrusion patterns PT2 is referred to as a "first length dn1", and a distance between two second protrusion patterns PT2 adjacent to each other among the protrusion patterns PT2 is referred to as a "second length dn2". In this case, the first protrusion patterns are disposed closer to the light source LG than the second protrusion patterns. Accordingly, the first length dn1 may be longer than the second length dn2.

Although not shown in figures, according to another embodiment, the protrusions PT1 may be omitted without being arranged at the upper surface LT-US of the light guide plate LGP, and only the protrusion patterns PT2 may be arranged at the lower surface LT-DS.

As described above, the optical sheet PS may be spaced apart from the flat regions of the upper surface LT-US of the light guide plate LGP by the protrusions PT or PT1 arranged in the second area LP-PA. As a result, damage such as scratching of the optical sheet PS and the flat regions of the light guide plate LGP may be reduced or effectively prevented.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
    a display panel comprising a display area at which an image is displayed with light and a non-display area which is disposed adjacent to the display area;
    a light guide plate through which the light is guided to the display panel, comprising:
        an upper surface comprising a first area overlapped with the display area of the display panel and a second area which is disposed adjacent to the first area and overlapped with the non-display area of the display panel,
        a lower surface facing the upper surface,
        a side surface connecting the upper surface and the lower surface to each other, and
        a plurality of protrusions arranged at the upper surface to be disposed in the second area of the upper surface;
    a light source which generates and provides the light to a portion of the side surface of the light guide plate; and
    an optical sheet disposed between the display panel and the upper surface of the light guide plate, contacting the protrusions in the second area of the upper surface, and spaced apart from the first area of the upper surface.

2. The display device of claim 1, wherein in a top plan view, the second area of the upper surface surrounds the first area thereof and comprises:
    a first sub-area and a second sub-area opposing each other in a first direction with respect to the first area of the upper surface, and
    a third sub-area and a fourth sub-area opposing each other a second direction which respect to the first area of the upper surface, the second direction crossing the first direction.

3. The display device of claim 2, wherein the protrusions are arranged at the upper surface to be disposed in each of the first, second, third and fourth sub-areas of the upper surface.

4. The display device of claim 2, wherein the protrusions are arranged at the upper surface to be disposed in only the first sub-area and the second sub-areas of the upper surface.

5. The display device of claim 4, wherein the third sub-area and the fourth sub-area of the upper surface exclude the protrusions and are flat.

6. The display device of claim 2, wherein in the top plan view,
the second area of the upper surface of the light guide plate further comprises:
a first overlap area in which the first sub-area is overlapped with the third sub-area;
a second overlap area in which the first sub-area is overlapped with the fourth sub-area;
a third overlap area in which the second sub-area is overlapped with the third sub-area; and
a fourth overlap area in which the second sub-area is overlapped with the fourth sub-area, and
the protrusions are arranged at the upper surface to be disposed in each of the first, second, third and fourth overlap areas.

7. The display device of claim 1, wherein
adjacent protrusions among the protrusions in the second area of the upper surface are respectively spaced apart from each other by a distance, and
distances between the protrusions are uniform within the second area of the upper surface.

8. The display device of claim 7, wherein the protrusions disposed in the second area of the upper surface have a same height as each other in a thickness direction of the light guide plate, and the height is smaller than each of the distances.

9. The display device of claim 8, wherein
the distance is in a range from about 0.2 millimeter to about 0.8 millimeter, and
the height is in a range from about 0.01 millimeter to about 0.1 millimeter.

10. The display device of claim 1, wherein the light guide plate further comprises a plurality of protrusion patterns arranged on the lower surface to overlap with the first area and the second area of the upper surface of the light guide plate.

11. The display device of claim 10, wherein in a top plan view, a distance between adjacent protrusion patterns among the protrusion patterns decreases as a distance from the light source increases and increases as the distance from the light source decreases.

12. The display device of claim 10, further comprising a reflective sheet disposed facing the lower surface of the light guide plate,
wherein the reflective sheet is spaced apart from the lower surface of the light guide plate by the protrusion patterns thereof.

13. The display device of claim 10, wherein the protrusions each have a shape different from a shape of each protrusion pattern.

14. The display device of claim 1, wherein the light guide plate includes a flat portion which defines a flat region of the upper surface, and the flat portion extends to define the protrusions integral with the flat portion.

15. The display device of claim 1, wherein the optical sheet contacting the protrusions in the second area of the upper surface and spaced apart from the first area of the upper surface comprises:
a diffusion sheet contacting the protrusions; and
a prism sheet disposed on the diffusion sheet.

16. The display device of claim 1, wherein a material of the optical sheet has a rigidity greater than a rigidity of a material of the light guide plate at the protrusions thereof.

17. A light guide plate comprising:
a flat portion through which light is guided to a display panel which displays an image with light, the flat portion defining:
an upper surface of the light plate, the upper surface comprising:
a first area overlapped with a display area of the display panel, and
a second area which is disposed adjacent to the first area and overlaps
a non-display area of the display panel,
a lower surface of the light guide plate facing the upper surface thereof, and
a side surface of the light guide plate connecting the upper surface and the lower surface to each other; and
a plurality of protrusions protruded from the upper surface of the flat portion to be disposed in the second area of the upper surface,
wherein in a top plan view, the second area of the upper surface comprises:
a first sub-area and a second sub-area opposing each other in a first direction with respect to the first area of the upper surface, and
a third sub-area and a fourth sub-area opposing each other in a second direction with respect to the first area of the upper surface, the second direction crossing the first direction.

18. The light guide plate of claim 17, wherein the protrusions are protruded from the upper surface of the flat portion to be disposed in each of the first, second, third and fourth sub-areas of the upper surface.

19. The light guide plate of claim 17, wherein the protrusions are protruded from the upper surface of the flat portion to be disposed in only the first sub-area and the second sub-area of the upper surface.

20. The light guide plate of claim 19, wherein the third sub-area and the fourth sub-areas of the upper surface exclude the protrusions and are flat.

21. The light guide plate of claim 17, wherein
adjacent protrusions among the protrusions in the second area of the upper surface are spaced apart from each other by a distance, and
distances between the protrusions are uniform within the second area of the upper surface.

* * * * *